(12) United States Patent
Taguchi et al.

(10) Patent No.: US 7,652,827 B2
(45) Date of Patent: Jan. 26, 2010

(54) ZOOM LENS (75) Inventors: Hironori Taguchi, Saitama (JP); Hiroyuki Taira, Yamagata (JP); Yuko Watanabe, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 124 days.

(21) Appl. No.: 12/073,018

(22) Filed: Feb. 28, 2008

(65) Prior Publication Data
US 2008/0212203 A1 Sep. 4, 2008

(30) Foreign Application Priority Data
Mar. 2, 2007 (JP) ............................. 2007-053275

(51) Int. Cl.
*G02B 15/14* (2006.01)
(52) U.S. Cl. ...................................... 359/691; 359/680
(58) Field of Classification Search ......... 359/690–691, 359/680–682
See application file for complete search history.

(56) References Cited

U.S. PATENT DOCUMENTS

| | | | | |
|---|---|---|---|---|
| 6,671,104 | B2 * | 12/2003 | Endo ........................... | 359/691 |
| 2002/0145809 | A1 * | 10/2002 | Okuyama .................... | 359/649 |
| 2002/0176177 | A1 | 11/2002 | Takatsuki et al. | |
| 2008/0019021 | A1 * | 1/2008 | Kawakami et al. .......... | 359/691 |

FOREIGN PATENT DOCUMENTS

| JP | 2002-277737 A | 9/2002 |
|---|---|---|
| JP | 3600870 B2 | 10/2004 |
| JP | 2006-119574 A | 5/2006 |

OTHER PUBLICATIONS

CBC Co., Ltd., <URL: http://www.computar.jp/cbc_program/OUT_FILEUPLOAD_B/49.pdf>, Feb. 19, 2007(retrieval date).

* cited by examiner

*Primary Examiner*—Jordan M. Schwartz
(74) *Attorney, Agent, or Firm*—Foley & Lardner LLP (57) ABSTRACT

A zoom lens includes a first and a second lens group respectively having negative and positive refractive power, and changes a focal length by changing a distance between the first and the second lens group. The second lens group includes a first lens having positive refractive power and a convex surface, a second lens having positive refractive power, an aspheric surface, and a convex surface, a third lens having negative refractive power, a fourth lens having positive refractive power, and a fifth lens including one lens or more having positive refractive power. The third and the fourth lenses are connected, and the zoom lens satisfies $Nd_{21}>1.8$ and $vd_{24}>80$, where $Nd_{21}$ is a refractive index of the first lens of the second lens group at a d-line, and $vd_{24}$ is an Abbe number of the fourth lens of the second lens group at a d-line.

5 Claims, 10 Drawing Sheets

(WIDE-ANGLE END)

(TELEPHOTO END)

(WIDE-ANGLE END)

(TELEPHOTO END)

(WIDE-ANGLE END)

(TELEPHOTO END)

(WIDE-ANGLE END)

(TELEPHOTO END)

ZOOM LENS

BACKGROUND OF THE INVENTION

This application claims priority from Japanese Patent Application No. 2007-053275 filed Mar. 2, 2007, which is incorporated herein by reference in its entirety.

1. Field of the Invention

The present invention relates to a technology of a zoom lens.

2. Description of the Related Art

Recently, various electronic imaging devices such as digital still cameras, video cameras, and surveillance camera have become common. Most of the electronic imaging devices include a zoom lens as an imaging lens. With the miniaturization of recent electronic imaging devices, further miniaturization of the zoom lens has been demanded, and many compact and wide-angle zoom lenses have been suggested to meet the demand (see Japanese Patent No. 3600870 and Japanese Patent Application Laid-open Publication Nos. 2006-119574 and 2002-277737).

A wide-angle zoom lens that has a large aperture and can monitor a dark place over a wider range has been preferable for a lens of the surveillance camera. However, due to the advance of megapixel resolution of imaging sensors such as a charge coupled device (CCD) and a complementary metal oxide semiconductor (CMOS), a megapixel-compatible lens for capturing finer characteristics of a subject has been expected, and a zoom lens adaptable to the megapixel resolution of the imaging sensors has been provided (see homepage of CBC Co., Ltd., URL:
http://www.computar.jp/cbc_program/OUT_FILEUP-LOAD_B/49.pdf)

The megapixel-compatible lens for the electronic imaging devices must correct well various aberrations occurring around a screen in order to capture finer characteristics of a subject.

However, the zoom lenses disclosed in the above three Japanese patent documents are unsuitable for the megapixel-compatible lens in the electronic imaging devices since sufficient correction the aberrations, such as axial chromatic and spherical aberrations, is difficult.

Further, although the lens disclosed in the above homepage of CBC Co., Ltd. is megapixel-compatible, the angle of view at the wide-angle end thereof is only 76°. Therefore, when a surveillance camera employing the lens disclosed in the above homepage of CBC Co., Ltd. is set at a corner of a room, there are blind spots due to the narrow angle of view, necessitating more than two cameras to eliminate the blind spots.

SUMMARY OF THE INVENTION

It is an object of the present invention to at least solve the above problems in the conventional technologies.

A zoom lens according to an aspect of the present invention includes a first lens group having negative refractive power and a second lens group having positive refractive power that are sequentially arranged from a subject side, and changes a focal length by changing a distance between the first lens group and the second lens group. The second lens group includes, sequentially arranged from the subject side, a first lens that has positive refractive power and a convex surface facing toward the subject side, a second lens that has positive refractive power, an aspheric surface, and a convex surface facing toward the subject side, a third lens having negative refractive power, a fourth lens having positive refractive power, and a fifth lens including one lens or more having positive refractive power. The third lens and the fourth lens are connected. The zoom lens satisfies $Nd_{21} > 1.8$ and $vd_{24} > 80$, where $Nd_{21}$ is a refractive index of the first lens of the second lens group at a d-line, and $vd_{24}$ is an Abbe number of the fourth lens of the second lens group at a d-line.

The other objects, features, and advantages of the present invention are specifically set forth in or will become apparent from the following detailed description of the invention when read in conjunction with the accompanying drawings.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Referring to the accompanying drawings, exemplary embodiments according to the present invention are explained in detail below.

A zoom lens according to an embodiment includes a first lens group having negative refractive power and a second lens group having positive refractive power that are sequentially arranged from a subject side. The zoom lens changes a focal length by changing the distance between the first and the second lens groups.

The first lens group includes a first and a second lens that are meniscus lenses having negative refractive power, a third lens that is a biconcave lens having negative refractive power, a fourth lens having positive refractive power, and a fifth lens having positive refractive power. The first to the fifth lenses are sequentially arranged from the subject side. The third and the fourth lenses are connected. The fifth lens may include two or more lenses.

The second lens group includes a first and a second lens that respectively have convex surfaces facing toward the subject side and positive refractive power, a third lens having negative refractive power, a fourth lens having positive refractive power, and a fifth lens having positive refractive power. The second lens has an aspheric surface. The third and the fourth lenses are connected. The fifth lens may include two or more lenses.

It is an object of the present invention to provide a zoom lens having high optical performance adaptable to imaging sensors having megapixel resolution. To achieve the object, sufficient correction of various aberrations occurring around a screen is required and to meet this requirement, various conditions are set as follows.

Since the zoom lens according to the embodiment is a wide-angle lens having a large aperture and the first lens group has negative refractive power, a beam of light emitted from the first lens group enters the second lens group at a very high position thereof, causing the aberrations such as spherical and coma aberrations.

Therefore, it is preferable for the zoom lens to satisfy the following condition where $Nd_{21}$ is the refractive index of the first lens of the second lens group at a d-line.

$$Nd_{21} > 1.8 \tag{1}$$

By satisfying the condition (1), the beam emitted from the first lens of the second lens group can be converged, and the position at which the beam enters the lenses subsequent to the first lens can be low. Furthermore, since the second lens of the second lens group has an aspheric surface as explained above, spherical and coma aberrations can be effectively prevented. Moreover, since the position at which the beam enters the lenses subsequent to the first lens can be low, spherical and coma aberrations for the lenses subsequent to the second lens can be prevented.

Furthermore, it is preferable for the zoom lens to satisfy the following condition where $vd_{24}$ is the Abbe number of the fourth lens of the second lens group at a d-line.

$$vd_{24} > 80 \tag{2}$$

By satisfying the condition (2), axial chromatic aberration and chromatic aberration of magnification can be reduced due to the synergic effect of the connection of the third and the fourth lenses of the second lens group.

Furthermore, by forming an aspheric surface on the subject side of the fifth lens of the second lens group, the spherical and the coma aberrations can be effectively prevented. Furthermore, by forming an aspheric surface on at least one side of the first lens of the second lens group, the various aberrations can be prevented more effectively.

Furthermore, by making the concave surface at the connection of the third and the fourth lenses of the second lens group face toward an image surface side, the axial chromatic aberration and the chromatic aberration of magnification can be reduced, and distortion and astigmatism can be prevented.

Furthermore, it is preferable for the zoom lens to satisfy the following conditions where $Nd_{11}$, $Nd_{13}$, and $Nd_{14}$ are respectively refractive indexes of the first, the third, and the fourth lenses of the first lens group at d-lines.

$$Nd_{11} > 1.7 \tag{3}$$

$$Nd_{13} > 1.7 \tag{4}$$

$$Nd_{14} > 1.7 \tag{5}$$

By satisfying the conditions (3) to (5), the coma aberration, the distortion and the astigmatism can be prevented.

Furthermore, it is preferable for the zoom lens to satisfy the following condition where $vd_{13}$ and $vd_{14}$ are respectively the Abbe number of the third and the fourth lenses of the first lens group.

$$vd_{13} > vd_{14} \tag{6}$$

By satisfying the condition (6), the chromatic aberration of magnification can be reduced due to the synergic effect of the connection of the third and the fourth lenses of the first lens group.

Furthermore, since the fifth lens having the positive refractive power of the first lens group is arranged closest to the image surface, the coma and the spherical aberrations can be prevented.

As explained above, since the zoom lens according to the embodiment has the above characteristics, the zoom lens is wide-angled, has a large aperture, high optical performance, and is adaptable to the image sensors having megapixel resolution. Furthermore, since the zoom lens includes the lens having the aspheric surface, the various aberrations can be effectively corrected with fewer lenses, and a reduction in size, weight, and manufacturing cost can be achieved.

When the values of the parameters are respectively close to the thresholds shown in the conditions (1) to (5), the effect of the present invention can be achieved.

Examples of the zoom lens according to the present invention are explained below.

Figure 1:
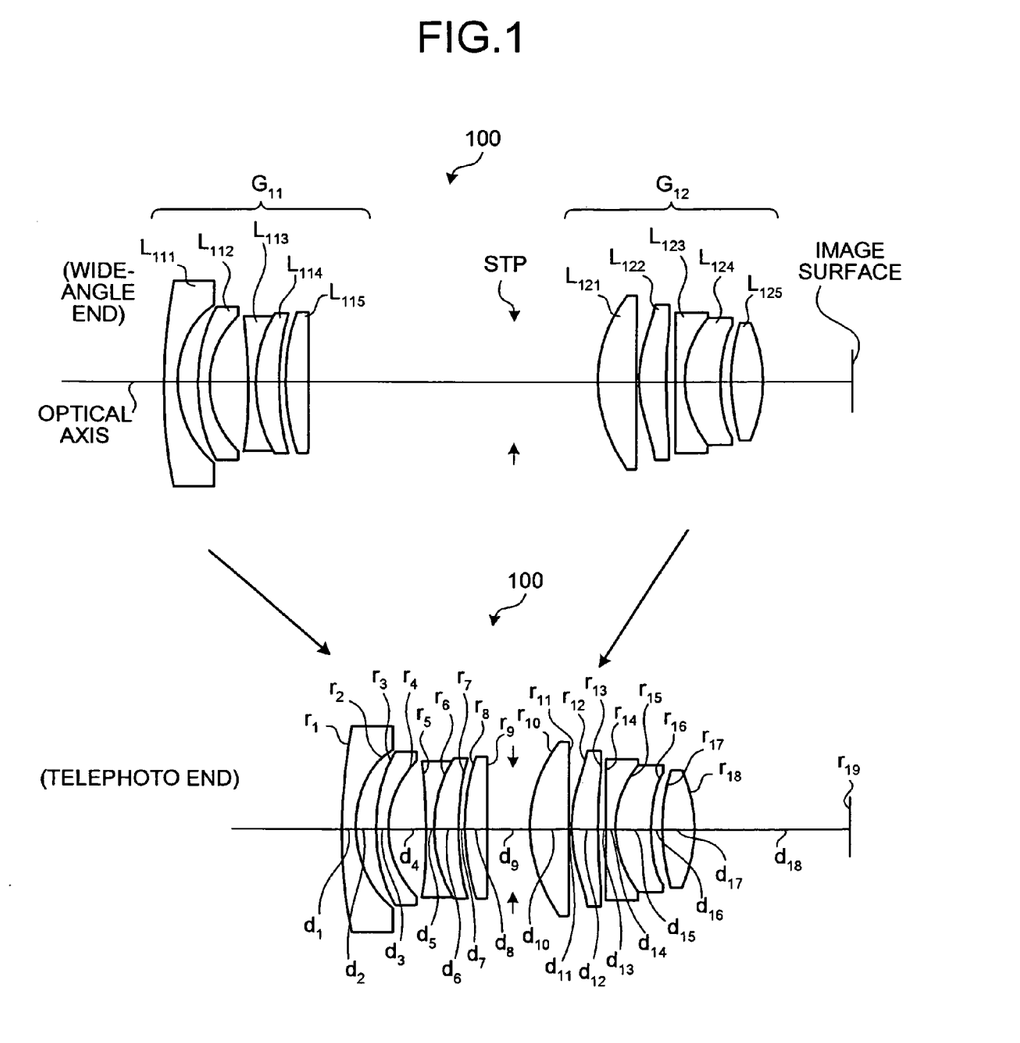
FIG. 1 is a cross sectional view of a zoom lens according to a first example.

FIG. 1 is a cross sectional view of a zoom lens according to a first example. A zoom lens 100 includes a first lens group $G_{11}$ having negative refractive power and a second lens group $G_{12}$ having positive refractive power that are sequentially arranged from a subject side (not shown). The zoom lens 100 changes a focal length by changing the distance between the first lens group $G_{11}$ and the second lens group $G_{12}$. An aperture stop (STP) is arranged between the first lens group $G_{11}$ and the second lens group $G_{12}$.

The first lens group $G_{11}$ includes a first lens $L_{111}$ that is a meniscus lens having negative refractive power, a second lens $L_{112}$ that is a meniscus lens having negative refractive power, a third lens $L_{113}$ that is a biconcave lens having negative refractive power, a fourth lens $L_{114}$ having positive refractive power, and a fifth lens $L_{115}$ having positive refractive power. The first to the fifth lenses are sequentially arranged from the subject side. The third lens $L_{113}$ and the fourth lens $L_{114}$ are connected.

The second lens group $G_{12}$ includes a first lens $L_{121}$ that has positive refractive power and a convex surface facing toward the subject side, a second lens $L_{122}$ that has positive refractive power and a convex surface facing toward the subject side, a third lens $L_{123}$ having negative refractive power, a fourth lens $L_{124}$ having positive refractive power, and a fifth lens $L_{125}$ having positive refractive power. The first to the fifth lenses are sequentially arranged from the subject side. Aspheric surfaces are formed on both sides of the second lens $L_{122}$. The third lens $L_{123}$ and the fourth lens $L_{124}$ are connected, and a concave surface at the connection faces toward an image surface side. Aspheric surfaces are formed on both sides of the fifth lens $L_{125}$.

Various data of the zoom lens according to the first example is shown below.

Focal length (f)=3.09~7.80 mm

F number=1.0 (wide-angle end)~1.6 (telephoto end)

Angle of view (2ω)=118° (wide-angle end)~44° (telephoto end)

Refractive index of the first lens $L_{121}$ of the second lens group $G_{12}$ at the d-line concerning the condition (1) ($Nd_{21}$)=1.83481

Abbe number of the fourth lens $L_{124}$ of the second lens group $G_{12}$ at the d-line concerning the condition (2) ($vd_{24}$)=81.6

Refractive index of the first lens $L_{111}$ of the first lens group $G_{11}$ at the d-line concerning the condition (3) ($Nd_{11}$)=1.83481

Refractive index of the third lens $L_{113}$ of the first lens group $G_{11}$ at the d-line concerning the condition (4) ($Nd_{13}$)=1.77250

Refractive index of the fourth lens $L_{114}$ of the first lens group $G_{11}$ at the d-line concerning the condition (5) ($Nd_{14}$)= 1.84666

Abbe number of the third lens $L_{113}$ of the first lens group $G_{11}$ at the d-line concerning the condition (6) ($vd_{13}$)=49.6

Abbe number of the fourth lens $L_{114}$ of the first lens group $G_{11}$ at the d-line concerning the condition (6) ($vd_{14}$)=23.8

$r_1$=60.6033
$\quad d_1$=1.2, $nd_1$=1.83481, $vd_1$=42.7
$r_2$=10.8740
$\quad d_2$=2.05
$r_3$=18.7901
$\quad d_3$=1.1, $nd_2$=1.77250, $vd_2$=49.6
$r_4$=10.1709
$\quad d_4$=3.58
$r_5$=−49.6783
$\quad d_5$=0.8, $nd_3$=1.77250, $vd_3$=49.6
$r_6$=14.0473
$\quad d_6$=2.2, $nd_4$=1.84666, $vd_4$=23.8
$r_7$=24.1536
$\quad d_7$=0.7
$r_8$=21.0585
$\quad d_8$=2.2, $nd_5$=1.84666, $vd_5$=23.8
$r_9$=491.3684
$\quad d_9g$=28.03 (wide-angle end)~4.29 (telephoto end)
$r_{10}$=14.9565
$\quad d_{10}$=3.8, $nd_6$=1.83481, $vd_6$=42.7
$r_{11}$=−357.1039
$\quad d_{11}$=0.15
$r_{12}$=14.1240 (aspheric surface)
$\quad d_{12}$=2.6, $nd_7$=1.58313, $vd_7$=59.5
$r_{13}$=46.6858 (aspheric surface)
$\quad d_{13}$=0.7
$r_{14}$=325.9099
$\quad d_{14}$=1, $nd_8$=1.92286, $vd_8$=20.9
$r_{15}$=10.2931
$\quad d_{15}$=3.5, $nd_9$=1.49700, $vd_9$=81.6
$r_{16}$=15.6119
$\quad d_{16}$=1
$r_{17}$=14.0429 (aspheric surface)
$\quad d_{17}$=3.2, $nd_{10}$=1.58313, $vd_{10}$=59.5
$r_{18}$=−13.2892 (aspheric surface)
$\quad d_{18}$=8.13 (wide-angle end)~14.66 (telephoto end)
$r_{19}$=∞

Cone coefficient (k) and aspheric coefficients (A, B, C, D, E)

Figure 2:
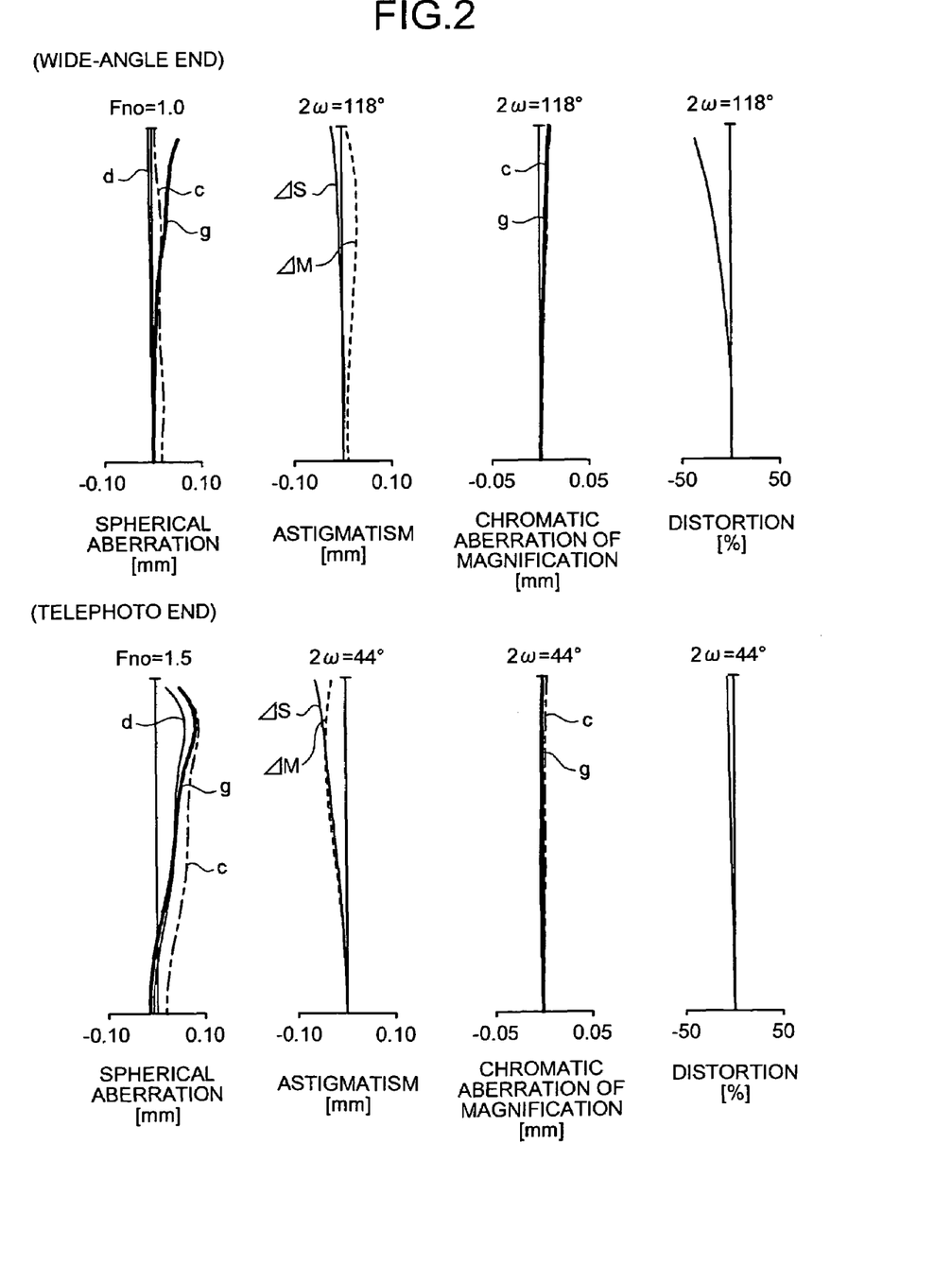
FIG. 2 is a schematic illustrating various aberrations of the zoom lens according to the first example.

(Twelfth Surface)
k=8.27400×10$^{-1}$, A=0,
B=−1.00359×10$^{-4}$, C=−3.83431×10$^{-7}$,
D=−5.88011×10$^{-8}$, E=5.12547×10$^{-10}$ (Thirteenth Surface)
k=8.60080, A=0,
B=−4.76037×10$^{-5}$, C=−2.72848×10$^{-7}$,
D=−3.95440×10$^{-8}$, E=5.43116×10$^{-10}$ (Seventeenth Surface)
k=2.47570, A=0,
B=−3.91850×10$^{-4}$, C=−3.29584×10$^{-7}$,
D=−7.51468×10$^{-9}$, E=3.15114×10$^{-10}$ (Eighteenth Surface)
k=9.08200×10$^{-1}$, A=0,
B=−3.92502×10$^{-5}$, C=−1.51006×10$^{-7}$,
D=−4.92045×10$^{-9}$, E=2.71461×10$^{-12}$ FIG. 2 is a schematic illustrating various aberrations of the zoom lens according to the first example. Fno and 2ω respectively indicate an F number and an angle of view. g, d, and c indicate aberrations corresponding to wavelengths of the g-line (λ=546.07 nm), the d-line (λ=587.6 nm), and the c-line (λ=656.3 nm), respectively. ΔS and ΔM respectively indicate aberrations with respect to the sagittal and the meridional image surfaces.

Figure 3:
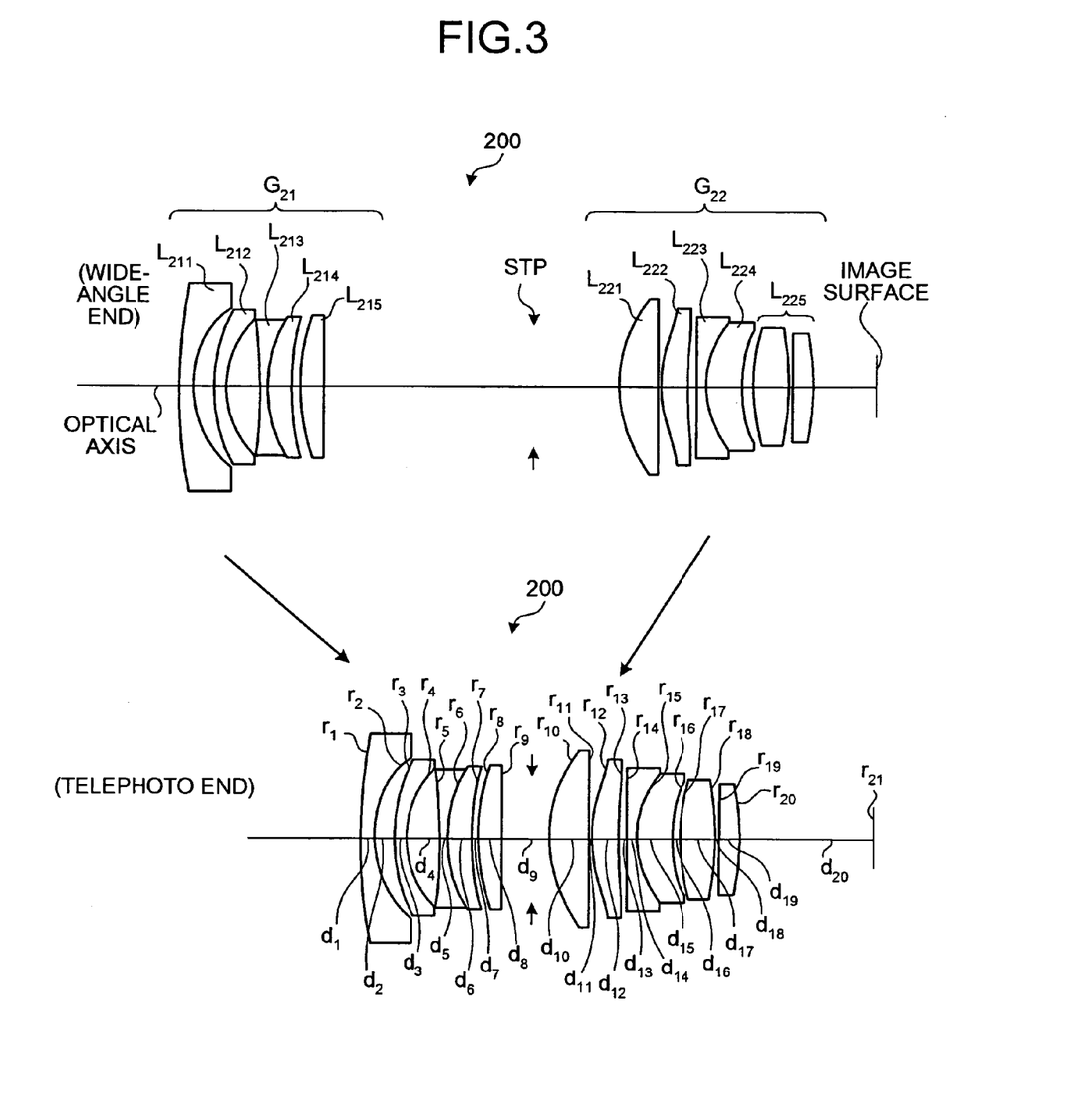
FIG. 3 is a cross sectional view of a zoom lens according to a second example.

FIG. 3 is a cross sectional view of a zoom lens according to a second example. A zoom lens 200 includes a first lens group $G_{21}$ having negative refractive power and a second lens group $G_{22}$ having positive refractive power that are sequentially arranged from a subject (not shown). The zoom lens 200 changes a focal length by changing the distance between the first lens group $G_{21}$ and the second lens group $G_{22}$. An STP is arranged between the first lens group $G_{21}$ and the second lens group $G_{22}$.

The first lens group $G_{21}$ includes a first lens $L_{211}$ that is a meniscus lens having negative refractive power, a second lens $L_{212}$ that is a meniscus lens having negative refractive power, a third lens $L_{213}$ that is a biconcave lens having negative refractive power, a fourth lens $L_{214}$ having positive refractive power, and a fifth lens $L_{215}$ having positive refractive power. The first to the fifth lenses are sequentially arranged from the subject side. The third lens $L_{213}$ and the fourth lens $L_{214}$ are connected.

The second lens group $G_{22}$ includes a first lens $L_{221}$ that has positive refractive power and a convex surface facing toward the subject side, a second lens $L_{222}$ that has positive refractive power and a convex surface facing toward the subject side, a third lens $L_{223}$ having negative refractive power, a fourth lens $L_{224}$ having positive refractive power, and a fifth lens $L_{225}$ that includes two lenses having positive refractive power. The first to the fifth lenses are sequentially arranged from the subject side. Aspheric surfaces are formed on both sides of the second lens $L_{222}$. The third lens $L_{223}$ and the fourth lens $L_{224}$ are connected, and a concave surface at the connection faces toward an image surface side. An aspheric surface is formed on a side of the fifth lens $L_{225}$ that is closest to the subject side.

Various data of the zoom lens according to the second example is shown below.

Focal length (f)=3.09~7.80 mm
F number=1.0 (wide-angle end)~1.5 (telephoto end)
Angle of view (2ω)=119° (wide-angle end)~44° (telephoto end)

Refractive index of the first lens $L_{221}$ of the second lens group $G_{22}$ at the d-line concerning the condition (1) ($Nd_{21}$)= 1.83481

Abbe number of the fourth lens $L_{224}$ of the second lens group $G_{22}$ at the d-line concerning the condition (2) ($vd_{24}$)=81.6

Refractive index of the first lens $L_{211}$ of the first lens group $G_{21}$ at the d-line concerning the condition (3) ($Nd_{11}$)= 1.83400

Refractive index of the third lens $L_{213}$ of the first lens group $G_{21}$ at the d-line concerning the condition (4) ($Nd_{13}$)= 1.77250

Refractive index of the fourth lens $L_{214}$ of the first lens group $G_{21}$ at the d-line concerning the condition (5) ($Nd_{14}$)= 1.84666

Abbe number of the third lens $L_{213}$ of the first lens group $G_{21}$ at the d-line concerning the condition (6) ($vd_{13}$)=49.6

Abbe number of the fourth lens $L_{214}$ of the first lens group $G_{21}$ at the d-line concerning the condition (6) ($vd_{14}$)=23.8

$r_1$=55.8123
$\quad d_1$=1.2, $nd_1$=1.83400, $vd_1$=37.2
$r_2$=10.9411
$\quad d_2$=2.05
$r_3$=15.1739
$\quad d_3$=1.1, $nd_2$=1.51633, $vd_2$=64.2
$r_4$=9.0642
$\quad d_4$=3.58

Figure 4:
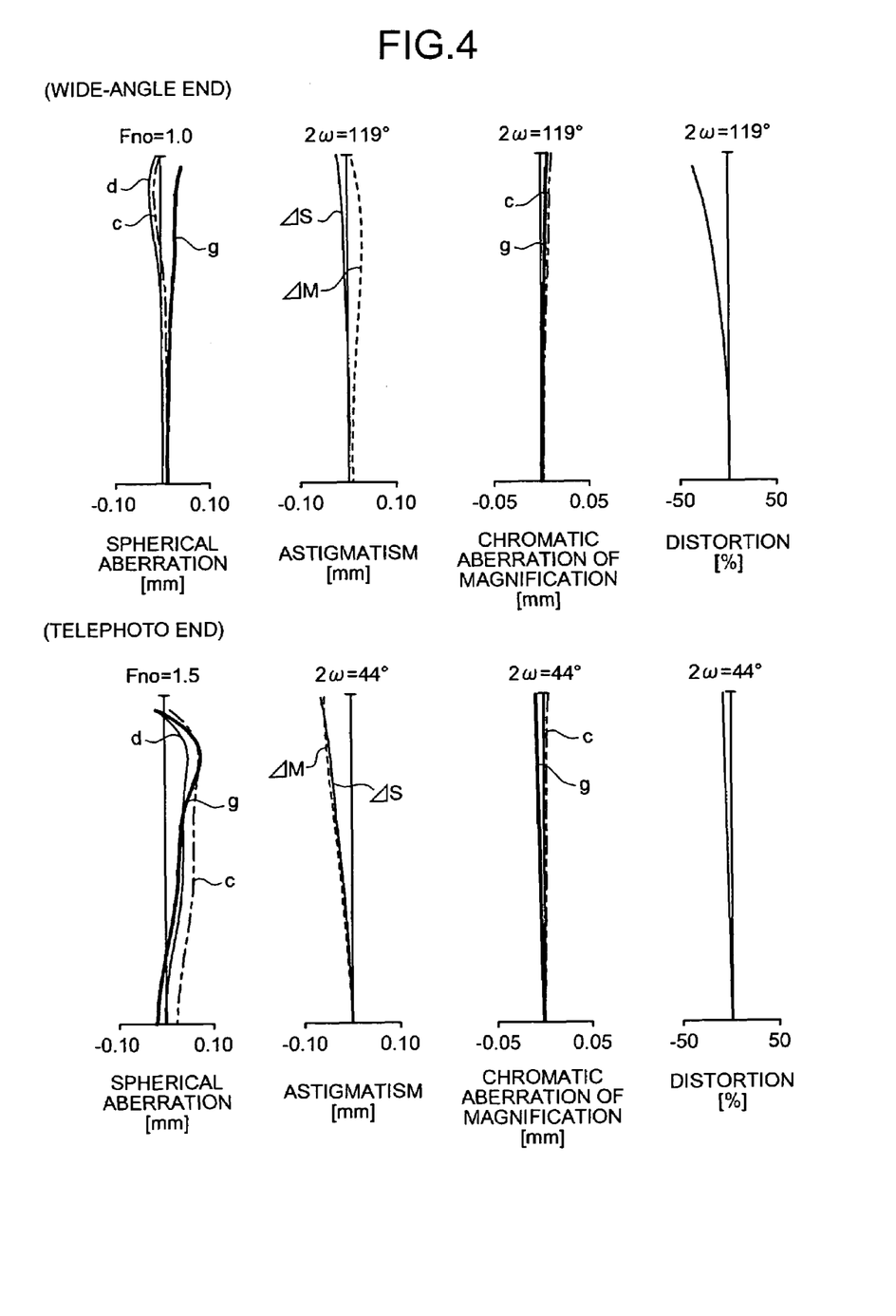
FIG. 4 is a schematic illustrating various aberrations of the zoom lens according to the second example.

$r_5=-44.4381$
  $d_5=0.8$, $nd_3=1.77250$, $vd_3=49.6$
$r_6=11.4504$
  $d_6=2.2$, $nd_4=1.84666$, $vd_4=23.8$
$r_7=18.6833$
  $d_7=0.7$
$r_8=18.2720$
  $d_8=2.2$, $nd_5=1.84666$, $vd_5=23.8$
$r_9=150.5239$
  $d_9=28.60$ (wide-angle end)~4.43 (telephoto end)
$r_{10}=16.1642$
  $d_{10}=3.8$, $nd_6=1.83481$, $vd_6=42.7$
$r_{11}=-99.2546$
  $d_{11}=0.15$
$r_{12}=12.0389$ (aspheric surface)
  $d_{12}=2.6$, $nd_7=1.58313$, $vd_7=59.5$
$r_{13}=33.1910$ (aspheric surface)
  $d_{13}=0.7$
$r_{14}=451.9460$
  $d_{14}=1$, $nd_8=1.92286$, $vd_8=20.9$
$r_{15}=9.6171$
  $d_{15}=3.5$, $nd_9=1.49700$, $vd_9=81.6$
$r_{16}=14.7193$
  $d_{16}=1$
$r_{17}=16.9707$ (aspheric surface)
  $d_{17}=3.2$, $nd_{10}=1.69350$, $vd_{10}=53.2$
$r_{18}=-35.2893$
  $d_{18}=0.3$
$r_{19}=142.9618$
  $d_{19}=2$, $nd_{11}=1.77250$, $vd_{11}=49.6$
$r_{20}=-31.6496$
  $d_{20}=6.95$ (wide-angle end)~13.13 (telephoto end)
$r_{21}=\infty$
Cone coefficient (k) and aspheric coefficients (A, B, C, D, E)
(Twelfth Surface)
$k=9.44000\times10^{-1}$, $A=0$,
$B=-2.13258\times10^{-5}$, $C=-1.39439\times10^{-6}$,
$D=-4.80023\times10^{-8}$, $E=-1.86387\times10^{-10}$ (Thirteenth Surface)
$k=8.95650$, $A=0$,
$B=5.02498\times10^{-5}$, $C=-4.17564\times10^{-6}$,
$D=-4.78727\times10^{-8}$, $E=4.69304\times10^{-10}$ (Seventeenth Surface)
$k=4.91630$, $A=0$,
$B=-2.37108\times10^{-4}$, $C=-1.51533\times10^{-6}$,
$D=-3.67432\times10^{-8}$, $E=4.28340\times10^{-10}$ FIG. 4 is a schematic illustrating various aberrations of the zoom lens according to the second example. Fno and 2ω respectively indicate an F number and an angle of view. g, d, and c indicate aberrations corresponding to wavelengths of the g-line (λ=546.07 nm), the d-line (λ=587.6 nm), and the c-line (λ=656.3 nm), respectively. ΔS and ΔM respectively indicate aberrations with respect to the sagittal and the meridional image surfaces.

Figure 5:
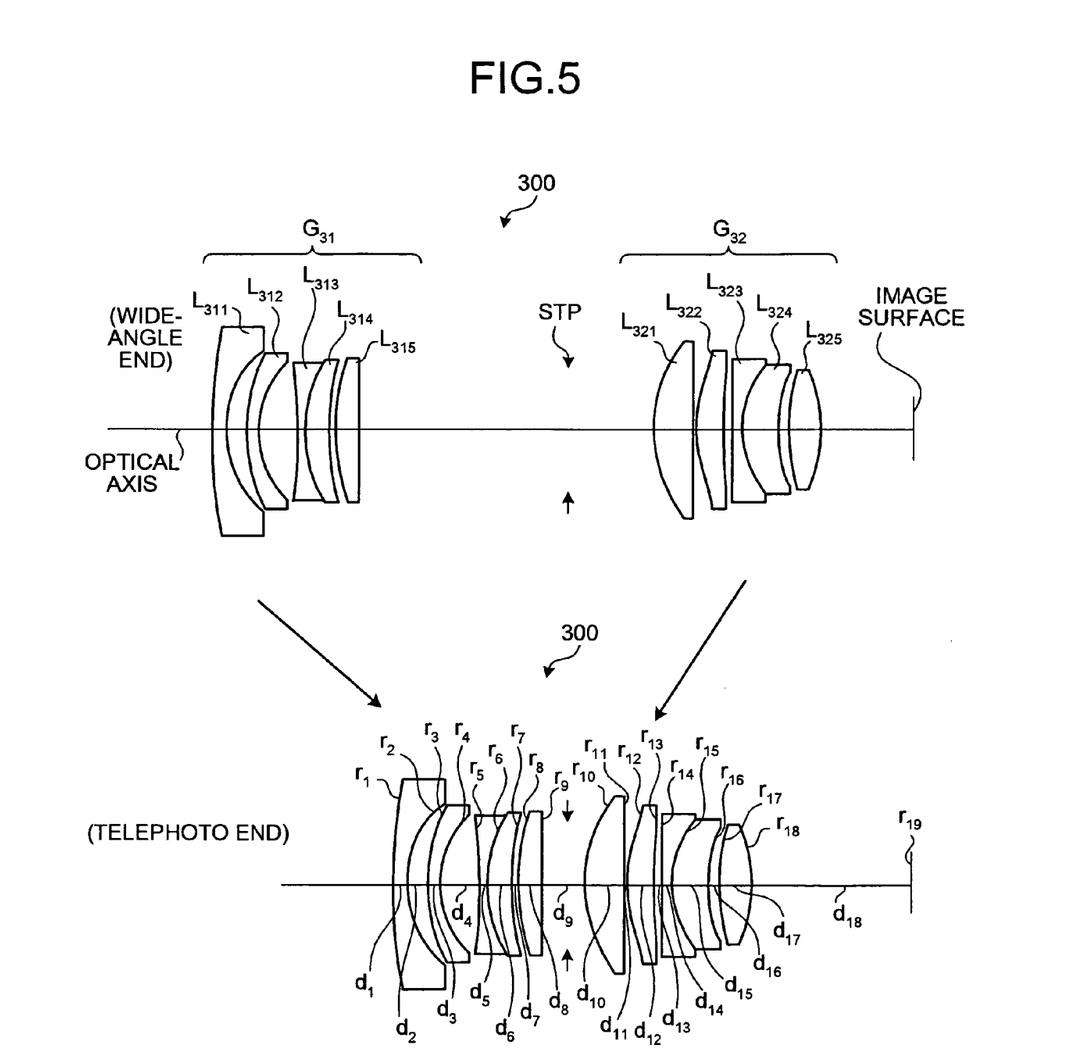
FIG. 5 is a cross sectional view of a zoom lens according to a third example.

FIG. 5 is a cross sectional view of a zoom lens according to a third example. A zoom lens 300 includes a first lens group $G_{31}$ having negative refractive power and a second lens group $G_{32}$ having positive refractive power that are sequentially arranged from a subject side (not shown). The zoom lens 300 changes a focal length by changing the distance between the first lens group $G_{31}$ and the second lens group $G_{32}$. An STP is arranged between the first lens group $G_{31}$ and the second lens group $G_{32}$.

The first lens group $G_{31}$ includes a first lens $L_{311}$ that is a meniscus lens having negative refractive power, a second lens $L_{312}$ that is a meniscus lens having negative refractive power, a third lens $L_{313}$ that is a biconcave lens having negative refractive power, a fourth lens $L_{314}$ having positive refractive power, and a fifth lens $L_{315}$ having positive refractive power. The first to the fifth lenses are sequentially arranged from the subject side. The third lens $L_{313}$ and the fourth lens $L_{314}$ are connected.

The second lens group $G_{32}$ includes a first lens $L_{321}$ that has positive refractive power and a convex surface facing toward the subject side, a second lens $L_{322}$ that has positive refractive power and a convex surface facing toward the subject side, a third lens $L_{323}$ having negative refractive power, a fourth lens $L_{324}$ having positive refractive power, and a fifth lens $L_{325}$ having positive refractive power. The first to the fifth lenses are sequentially arranged from the subject side. An aspheric surface is formed on the subject side of the first lens $L_{321}$. Aspheric surfaces are formed on both sides of the second lens $L_{322}$. The third lens $L_{323}$ and the fourth lens $L_{324}$ are connected, and a concave surface at the connection faces toward an image surface side. Aspheric surfaces are formed on both sides of the fifth lens $L_{325}$.

Various data of the zoom lens according to the third example is shown below.
Focal length (f)=3.09~7.80 mm
F number=1.0 (wide-angle end)~1.6 (telephoto end)
Angle of view (2ω))=119° (wide-angle end)~44° (telephoto end)
Refractive index of the first lens $L_{321}$ of the second lens group $G_{32}$ at the d-line concerning the condition (1) $(Nd_{21})=1.88300$
Abbe number of the fourth lens $L_{324}$ of the second lens group $G_{32}$ at the d-line concerning the condition (2) $(vd_{24})=81.6$
Refractive index of the first lens $L_{311}$ of the first lens group $G_{31}$ at the d-line concerning the condition (3) $(Nd_{11})=1.83481$
Refractive index of the third lens $L_{313}$ of the first lens group $G_{31}$ at the d-line concerning the condition (4) $(Nd_{13})=1.77250$
Refractive index of the fourth lens $L_{314}$ of the first lens group $G_{31}$ at the d-line concerning the condition (5) $(Nd_{14})=1.84666$
Abbe number of the third lens $L_{313}$ of the first lens group $G_{31}$ at the d-line concerning the condition (6) $(vd_{13})=49.6$
Abbe number of the fourth lens $L_{314}$ of the first lens group $G_{31}$ at the d-line concerning the condition (6) $(vd_{14})=23.8$
$r_1=64.9127$
  $d_1=1.2$, $nd_1=1.83481$, $vd_1=42.7$
$r_2=10.9174$
  $d_2=2.05$
$r_3=18.9499$
  $d_3=1.1$, $nd_2=1.77250$, $vd_2=49.6$
$r_4=10.0782$
  $d_4=3.5$
$r_5=-49.4618$
  $d_5=0.8$, $nd_3=1.77250$, $vd_3=49.6$
$r_6=14.8542$
  $d_6=2.2$, $nd_4=1.84666$, $vd_4=23.8$
$r_7=23.6065$
  $d_7=0.7$
$r_8=20.7533$
  $d_8=2.2$, $nd_5=1.84666$, $vd_5=23.8$
$r_9=498.2260$
  $d_9=27.60$ (wide-angle end)~4.33 (telephoto end)
$r_{10}=15.0799$ (aspheric surface)
  $d_{10}=4.2$, $nd_6=1.88330$, $vd_6=40.8$
$r_{11}=-488.0928$
  $d_{11}=0.15$ $r_{12}$=14.2660 (aspheric surface)
  $d_{12}$=2.6, $nd_7$=1.58313, $vd_7$=59.5
$r_{13}$=46.0664 (aspheric surface)
  $d_{13}$=0.7
$r_{14}$=488.9254
  $d_{14}$=1, $nd_8$=1.92286, $vd_8$=20.9
$r_{15}$=9.7322
  $d_{15}$=3.5, $nd_9$=1.49700, $vd_9$=81.6
$r_{16}$=16.5501
  $d_{16}$=1
$r_{17}$=13.8353 (aspheric surface)
  $d_{17}$=3.2, $nd_{10}$=1.58313, $vd_{10}$=59.5
$r_{18}$=−13.5661 (aspheric surface)
  $d_{18}$=7.99 (wide-angle end)~14.70 (telephoto end)
$r_{19}$=∞

Cone coefficient (k) and aspheric coefficients (A, B, C, D, E)

Figure 6:
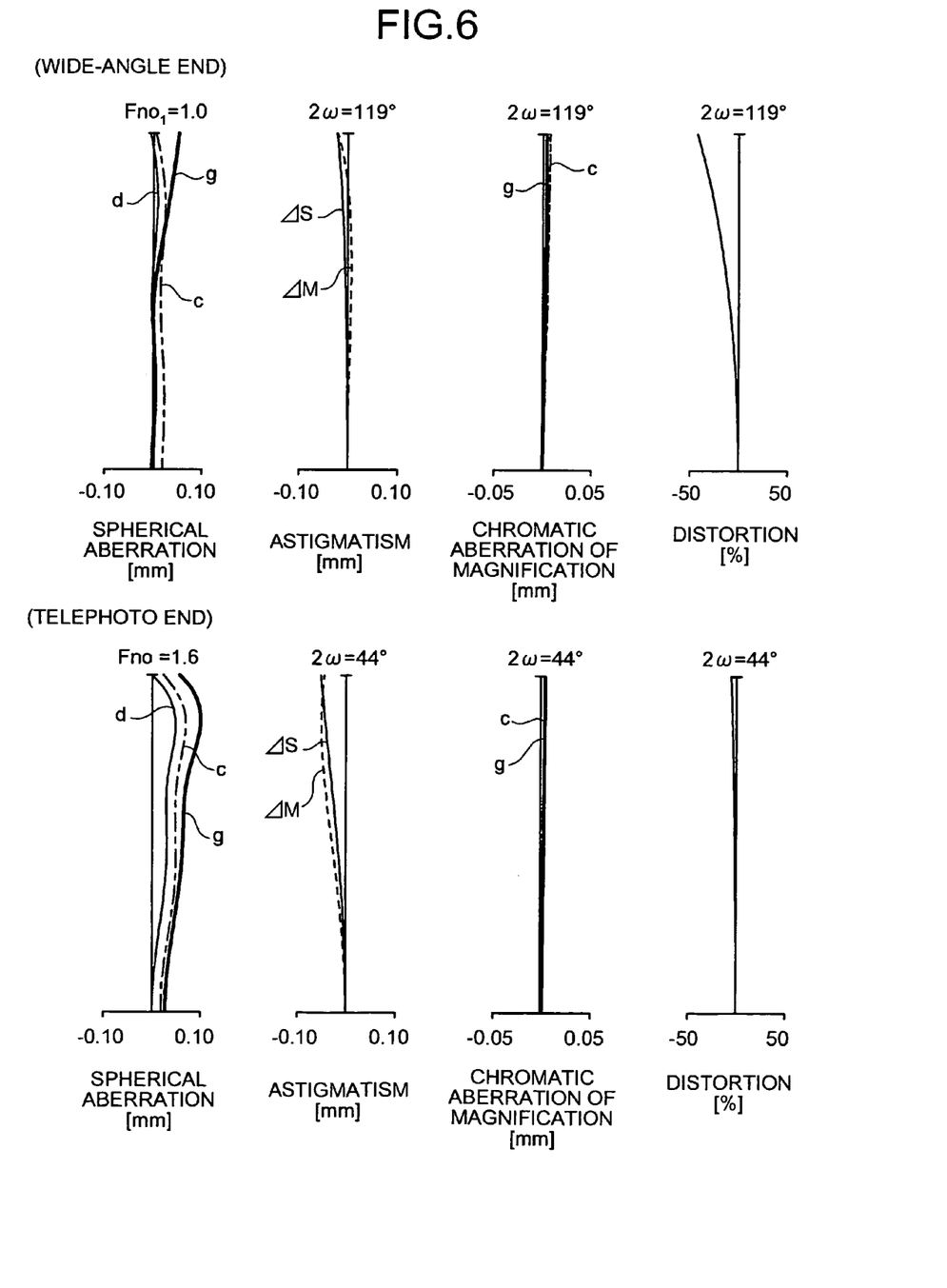
FIG. 6 is a schematic illustrating various aberrations of the zoom lens according to the third example.

(Tenth Surface)
k=9.79300×10$^{-1}$, A=0,
B=−1.15675×10$^{-6}$, C=−1.3581×10$^{-8}$,
D=−1.61354×10$^{-10}$, E=−1.34196×10$^{-12}$ (Twelfth Surface)
k=8.4470×10$^{-1}$, A=0,
B=−9.97588×10$^{-5}$, C=−3.55011×10$^{-7}$,
D=−5.82412×10$^{-8}$, E=5.23118×10$^{-10}$ (Thirteenth Surface)
k=8.19940, A=0,
B=−4.83212×10$^{-5}$, C=−2.93684×10$^{-7}$,
D=−4.02161×10$^{-8}$, E=5.32036×10$^{-10}$ (Seventeenth Surface)
k=2.51040, A=0,
B=−3.86883×10$^{-4}$, C=−3.53290×10$^{-7}$,
D=−5.27952×10$^{-9}$, E=3.92750×10$^{-10}$ (Eighteenth Surface)
k=8.91600×10$^{-1}$, A=0,
B=−3.86305×10$^{-5}$, C=3.13142×10$^{-9}$,
D=−7.96596×10$^{-10}$, E=9.16774×10$^{-11}$ FIG. 6 is a schematic illustrating various aberrations of the zoom lens according to the third example. Fno and 2ω respectively indicate an F number and an angle of view. g, d, and c indicate aberrations corresponding to wavelengths of the g-line (λ=546.07 nm), the d-line (λ=587.6 nm), and the c-line (λ=656.3 nm), respectively. ΔS and ΔM respectively indicate aberrations with respect to the sagittal and the meridional image surfaces.

Figure 7:
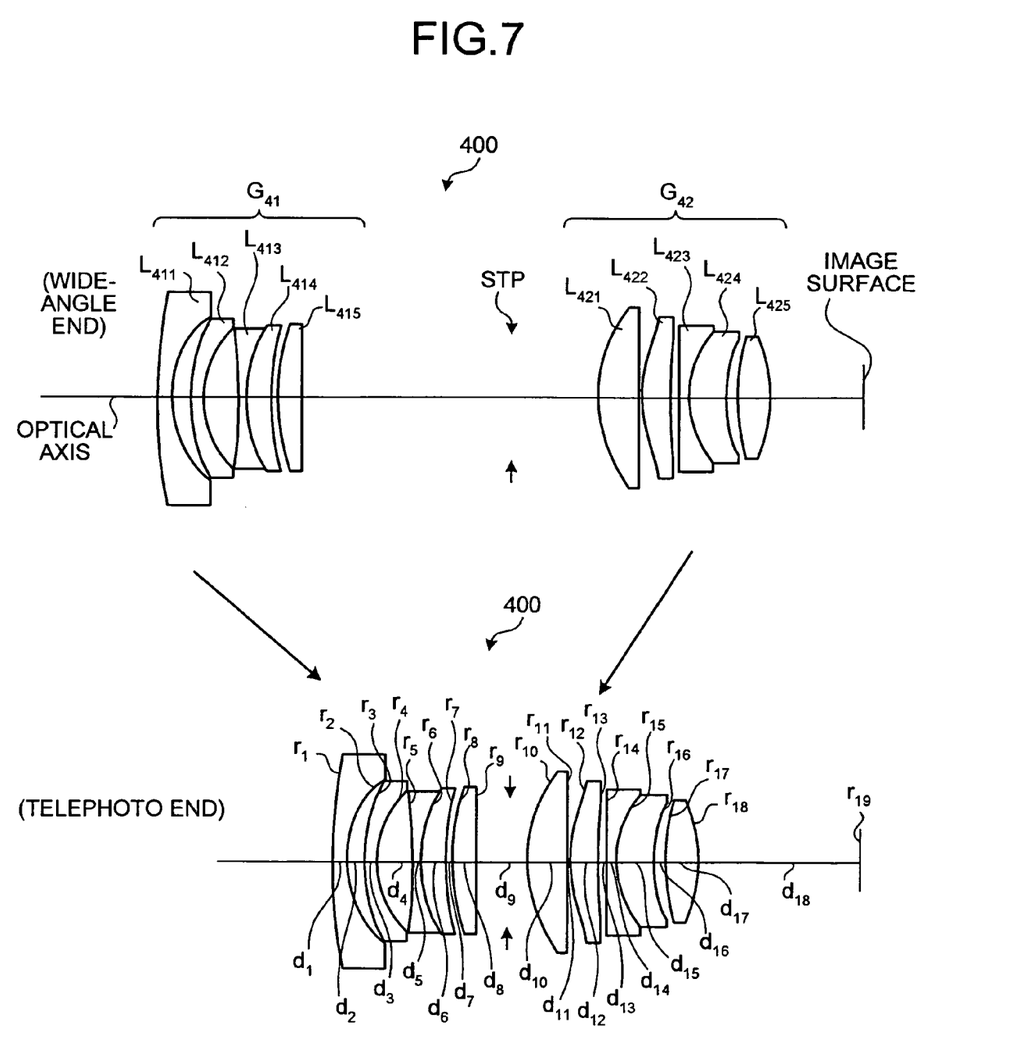
FIG. 7 is a cross sectional view of a zoom lens according to a fourth example.

FIG. 7 is a cross sectional view of a zoom lens according to a fourth example. A zoom lens 400 includes a first lens group $G_{41}$ having negative refractive power and a second lens group $G_{42}$ having positive refractive power that are sequentially arranged from a subject side (not shown). The zoom lens 400 changes a focal length by changing the distance between the first lens group $G_{41}$ and the second lens group $G_{42}$. An STP is arranged between the first lens group $G_{41}$ and the second lens group $G_{42}$.

The first lens group $G_{41}$ includes a first lens $L_{411}$ that is a meniscus lens having negative refractive power, a second lens $L_{412}$ that is a meniscus lens having negative refractive power, a third lens $L_{413}$ that is a biconcave lens having negative refractive power, a fourth lens $L_{414}$ having positive refractive power, and a fifth lens $L_{415}$ having positive refractive power. The first to the fifth lenses are sequentially arranged from the subject side. The third lens $L_{413}$ and the fourth lens $L_{414}$ are connected.

The second lens group $G_{42}$ includes a first lens $L_{421}$ that has positive refractive power and a convex surface facing toward the subject side, a second lens $L_{422}$ that has positive refractive power and a convex surface facing toward the subject side, a third lens $L_{423}$ having negative refractive power, a fourth lens $L_{424}$ having positive refractive power, and a fifth lens $L_{425}$ having positive refractive power. The first to the fifth lenses are sequentially arranged from the subject side. An aspheric surface is formed on an image surface side of the first lens $L_{421}$. Aspheric surfaces are formed on both sides of the second lens $L_{422}$. The third lens $L_{423}$ and the fourth lens $L_{424}$ are connected, and a concave surface at the connection faces toward the image surface side. Aspheric surfaces are formed on both sides of the fifth lens $L_{425}$.

Various data of the zoom lens according to the fourth example is shown below.

Focal length (f)=3.09~7.80 mm
F number=1.0 (wide-angle end)~1.6 (telephoto end)
Angle of view (2ω)=119° (wide-angle end)~44° (telephoto end)
Refractive index of the first lens $L_{421}$ of the second lens group $G_{42}$ at the d-line concerning the condition (1) ($Nd_{21}$)=1.83481
Abbe number of the fourth lens $L_{424}$ of the second lens group $G_{42}$ at the d-line concerning the condition (2) ($vd_{24}$)=81.6
Refractive index of the first lens $L_{411}$ of the first lens group $G_{41}$ at the d-line concerning the condition (3) ($Nd_{11}$)=1.83481
Refractive index of the third lens $L_{413}$ of the first lens group $G_{41}$ at the d-line concerning the condition (4) ($Nd_{13}$)=1.77250
Refractive index of the fourth lens $L_{414}$ of the first lens group $G_{41}$ at the d-line concerning the condition (5) ($Nd_{14}$)=1.84666
Abbe number of the third lens $L_{413}$ of the first lens group $G_{41}$ at the d-line concerning the condition (6) ($vd_{13}$)=49.6
Abbe number of the fourth lens $L_{414}$ of the first lens group $G_{41}$ at the d-line concerning the condition (6) ($vd_{14}$)=23.8

$r_1$=64.9079
  $d_1$=1.2, $nd_1$=1.83481, $vd_1$=42.7
$r_2$=10.9922
  $d_2$=2.05
$r_3$=19.5773
  $d_3$=1.1, $nd_2$=1.77250, $vd_2$=49.6
$r_4$=10.3857
  $d_4$=3.58
$r_5$=−46.9958
  $d_5$=0.8, $nd_3$=1.77250, $vd_3$=49.6
$r_6$=19.0159
  $d_6$=2.2, $nd_4$=1.84666, $vd_4$=23.8
$r_7$=24.4858
  $d_7$=0.7
$r_8$=21.7135
  $d_8$=2.5, $nd_5$=1.92286, $vd_5$=20.9
$r_9$=379.1354
  $d_9$=28.09 (wide-angle end)~3.45 (telephoto end)
$r_{10}$=14.8432
  $d_{10}$=4, $nd_6$=1.83481, $vd_6$=42.7
$r_{11}$=−422.4805 (aspheric surface)
  $d_{11}$=0.15
$r_{12}$=14.0188 (aspheric surface)
  $d_{12}$=2.6, $nd_7$=1.58313, $vd_7$=59.5
$r_{13}$=48.5354 (aspheric surface)
  $d_{13}$=0.7
$r_{14}$=455.5553
  $d_{14}$=1, $nd_8$=1.92286, $vd_8$=20.9
$r_{15}$=10.1482
  $d_{15}$=3.5, $nd_9$=1.49700, $vd_9$=81.6

$r_{16}=15.9114$
$d_{16}=1$
$r_{17}=13.7916$ (aspheric surface)
$d_{17}=3.2$, $nd_{10}=1.58313$, $vd_{10}=59.5$
$r_{18}=-13.5985$ (aspheric surface)
$d_{18}=7.94$ (wide-angle end)~15.73 (telephoto end)
$r_{19}=\infty$
Cone coefficient (k) and aspheric coefficients (A, B, C, D, E)

Figure 8:
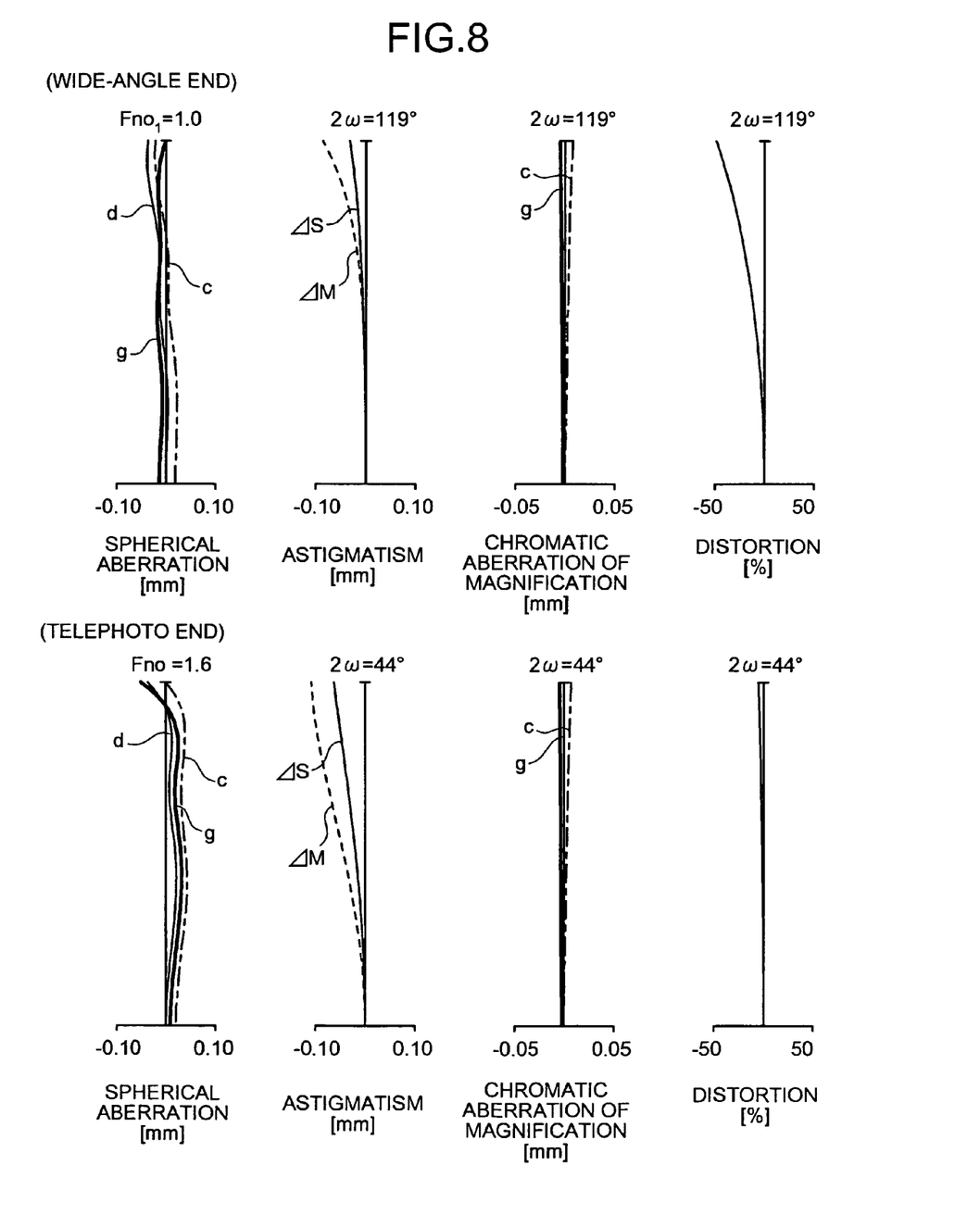
FIG. 8 is a schematic illustrating various aberrations of the zoom lens according to the fourth example.

(Eleventh Surface)
$k=-2.95000\times10^{2}$, $A=0$,
$B=1.19722\times10^{-6}$, $C=3.56071\times10^{-8}$,
$D=5.97730\times10^{-10}$, $E=-4.50861\times10^{-12}$ (Twelfth Surface)
$k=8.75700\times10^{-1}$, $A=0$,
$B=-9.95106\times10^{-5}$, $C=-2.07044\times10^{-7}$,
$D=-5.89465\times10^{-8}$, $E=5.14731\times10^{-10}$ (Thirteenth Surface)
$k=9.35610$, $A=0$,
$B=-4.61820\times10^{-5}$, $C=-3.29212\times10^{-7}$,
$D=-3.94493\times10^{-8}$, $E=5.06525\times10^{-10}$ (Seventeenth Surface)
$k=2.38150$, $A=0$,
$B=-3.83180\times10^{-4}$, $C=-7.18720\times10^{-7}$,
$D=-1.87515\times10^{-9}$, $E=4.3322\times10^{-10}$ (Eighteenth Surface)
$k=8.42900\times10^{-1}$, $A=0$,
$B=-3.64406\times10^{-5}$, $C=1.49696\times10^{-7}$,
$D=-9.79469\times10^{-10}$, $E=2.92381\times10^{-10}$ FIG. 8 is a schematic illustrating various aberrations of the zoom lens according to the fourth example. Fno and 2ω respectively indicate an F number and an angle of view. g, d, and c indicate aberrations corresponding to wavelengths of the g-line (λ=546.07 nm), the d-line (λ=587.6 nm), and the c-line (λ=656.3 nm), respectively. ΔS and ΔM respectively indicate aberrations with respect to the sagittal and the meridional image surfaces.

Figure 9:
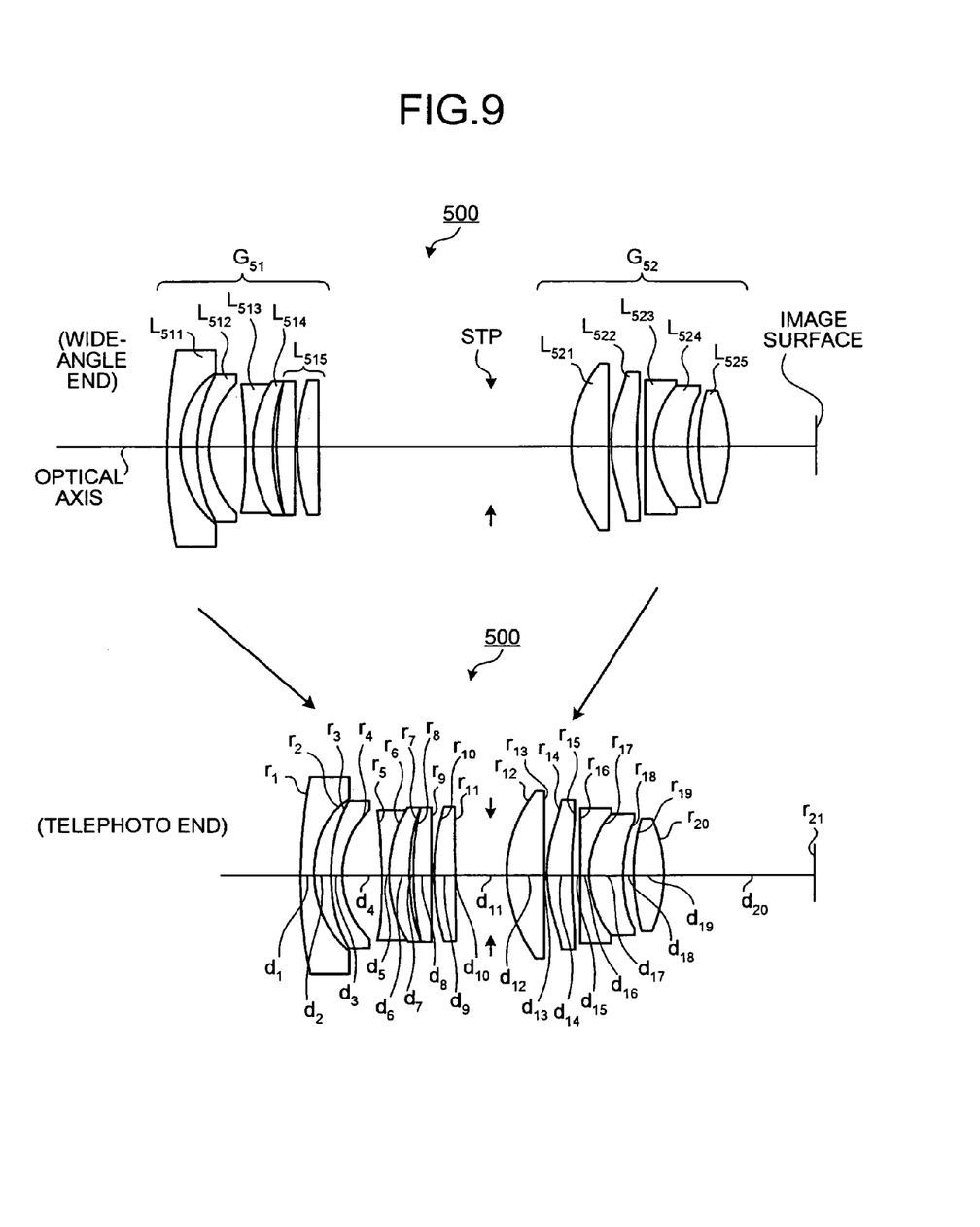
FIG. 9 is a cross sectional view of a zoom lens according to a fifth example.

FIG. 9 is a cross sectional view of a zoom lens according to a fifth example. A zoom lens 500 includes a first lens group $G_{51}$ having negative refractive power and a second lens group $G_{52}$ having positive refractive power that are sequentially arranged from a subject side (not shown). The zoom lens 500 changes a focal length by changing the distance between the first lens group $G_{51}$ and the second lens group $G_{52}$. An STP is arranged between the first lens group $G_{51}$ and the second lens group $G_{52}$.

The first lens group $G_{51}$ includes a first lens $L_{511}$ that is a meniscus lens having negative refractive power, a second lens $L_{512}$ that is a meniscus lens having negative refractive power, a third lens $L_{513}$ that is a biconcave lens having negative refractive power, a fourth lens $L_{514}$ having positive refractive power, and a fifth lens $L_{515}$ that includes two lenses having positive refractive power. The first to the fifth lenses are sequentially arranged from the subject side. The third lens $L_{513}$ and the fourth lens $L_{514}$ are connected.

The second lens group $G_{52}$ includes a first lens $L_{521}$ that has positive refractive power and a convex surface facing toward the subject side, a second lens $L_{522}$ that has positive refractive power and a convex surface facing toward the subject side, a third lens $L_{523}$ having negative refractive power, a fourth lens $L_{524}$ having positive refractive power, and a fifth lens $L_{525}$ having positive refractive power. The first to the fifth lenses are sequentially arranged from the subject side. Aspheric surfaces are formed on both sides of the second lens $L_{522}$. The third lens $L_{523}$ and the fourth lens $L_{524}$ are connected, and a concave surface at the connection faces toward an image surface side. Aspheric surfaces are formed on both sides of the fourth lens $L_{524}$.

Various data of the zoom lens according to the fifth example is shown below.
Focal length (f)=3.09~7.80 mm
F number=1.0 (wide-angle end)~1.5 (telephoto end)
Angle of view (2ω)=118° (wide-angle end)~44° (telephoto end)
Refractive index of the first lens $L_{521}$ of the second lens group $G_{52}$ at the d-line concerning the condition (1) $(Nd_{21})=1.83481$
Abbe number of the fourth lens $L_{524}$ of the second lens group $G_{52}$ at the d-line concerning the condition (2) $(vd_{24})=81.6$
Refractive index of the first lens $L_{511}$ of the first lens group $G_{51}$ at the d-line concerning the condition (3) $(Nd_{11})=1.83481$
Refractive index of the third lens $L_{513}$ of the first lens group $G_{51}$ at the d-line concerning the condition (4) $(Nd_{13})=1.77250$
Refractive index of the fourth lens $L_{514}$ of the first lens group $G_{51}$ at the d-line concerning the condition (5) $(Nd_{14})=1.84666$
Abbe number of the third lens $L_{513}$ of the first lens group $G_{51}$ at the d-line concerning the condition (6) $(vd_{13})=49.6$
Abbe number of the fourth lens $L_{514}$ of the first lens group $G_{51}$ at the d-line concerning the condition (6) $(vd_{14})=23.8$
$r_{1}=60.5734$
$d_{1}=1.2$, $nd_{1}=1.83481$, $vd_{1}=42.7$
$r_{2}=11.1643$
$d_{2}=2.06$
$r_{3}=26.2792$
$d_{3}=1.1$, $nd_{2}=1.77250$, $vd_{2}=49.6$
$r_{4}=11.1041$
$d_{4}=3.59$
$r_{5}=-50.546$
$d_{5}=0.8$, $nd_{3}=1.77250$, $vd_{3}=49.6$
$r_{6}=14.4653$
$d_{6}=2.2$, $nd_{4}=1.84666$, $vd_{4}=23.8$
$r_{7}=23.2261$
$d_{7}=0.5$
$r_{8}=42.2195$
$d_{8}=1.5$, $nd_{5}=1.84666$, $vd_{5}=23.8$
$r_{9}=105.2362$
$d_{9}=0.2$
$r_{10}=23.2419$
$d_{10}=2.2$, $nd_{6}=1.84666$, $vd_{6}=23.8$
$r_{11}=131.754$
$d_{11}=26.44$ (wide-angle end)~3.19 (telephoto end)
$r_{12}=14.4618$
$d_{12}=3.8$, $nd_{7}=1.83481$, $vd_{7}=42.7$
$r_{13}=-463.3355$
$d_{13}=0.15$
$r_{14}=14.9229$ (aspheric surface)
$d_{14}=2.6$, $nd_{8}=1.58313$, $vd_{8}=59.5$
$r_{15}=62.3666$ (aspheric surface)
$d_{15}=0.7$
$r_{16}=254.2529$
$d_{16}=1$, $nd_{9}=1.92286$, $vd_{9}=20.9$
$r_{17}=10.0434$ (aspheric surface)
$d_{17}=3.5$, $nd_{10}=1.49700$, $vd_{10}=81.6$
$r_{18}=15.2948$ (aspheric surface)
$d_{18}=1$
$r_{19}=14.4335$
$d_{19}=3.2$, $nd_{11}=1.58313$, $vd_{11}=59.5$
$r_{20}=-13.4136$
$d_{20}=8.04$ (wide-angel end)~14.68 (telephoto end)

$r_{21}=\infty$

Cone coefficient (k) and aspheric coefficients (A, B, C, D, E)

Figure 10:
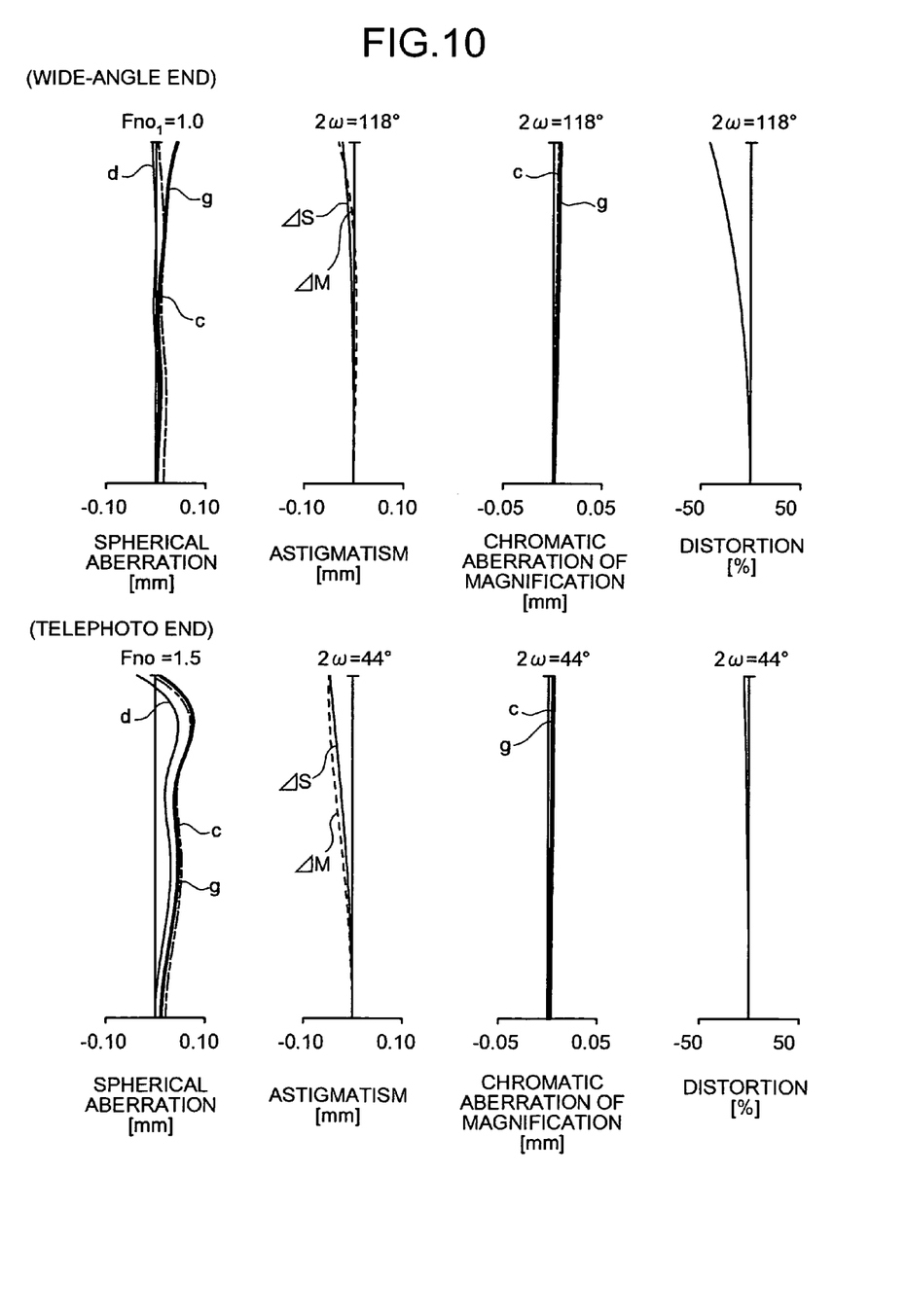
FIG. 10 is a schematic illustrating various aberrations of the zoom lens according to the fifth example.

(Fourteenth Surface)
k=7.30200×10$^{-1}$, A=0,
B=−1.07745×10$^{-4}$, C=−3.84171×10$^{-7}$,
D=−5.65524×10$^{-8}$, E=5.15563×10$^{-10}$ (Fifteenth Surface)
k=1.56235×10, A=0,
B=−4.11663×10$^{-5}$, C=−2.26754×10$^{-7}$,
D=−3.67543×10$^{-8}$, E=4.80302×10$^{-10}$ (Seventeenth Surface)
k=2.67600, A=0,
B=−3.93389×10$^{-4}$, C=−1.11715×10$^{-7}$,
D=−3.73849×10$^{-8}$, E=1.21867×10$^{-9}$ (Eighteenth Surface)
k=9.65000×10$^{-1}$, A=0,
B=−3.97337×10$^{-5}$, C=−5.49935×10$^{-7}$,
D=7.11544×10$^{-9}$, E=2.52492×10$^{-10}$ FIG. 10 is a schematic illustrating various aberrations of the zoom lens according to the fifth example. Fno and 2ω respectively indicate an F number and an angle of view. g, d, and c indicate aberrations corresponding to wavelengths of the g-line (λ=546.07 nm), the d-line (λ=587.6 nm), and the c-line (λ=656.3 nm), respectively. ΔS and ΔM respectively indicate aberrations with respect to the sagittal and the meridional image surfaces.

In the above data, $r_i$ indicates a curvature radius of each lens, $d_i$ indicates a thickness of each lens or an interval of lens surfaces, $nd_i$ indicates a refractive index of each lens at the d-line, and $vd_i$ indicates an Abbe number of each lens at the d-line where i is a positive integer.

The each aspheric surface is expressed by the following equation.

$$X = \frac{(1/R)Y^2}{1+\sqrt{1-k(Y/R)^2}} + AY^2 + BY^4 + CY^6 + DY^8 + EY^{10}$$

Where, X is the X-axis along an optical axis, Y is the Y-axis perpendicular to the optical axis, a travel direction of light is positive, R is a paraxial curvature radius, and A, B, C, D, and E respectively indicate two, four, six, eight, and ten dimensional aspheric coefficients.

As explained above, since the zoom lens according to the embodiment has the above characteristics, the zoom lens becomes wide-angled, has a large aperture, high performance, and is adaptable to imaging sensors having megapixel resolution. Since the angle of view at the wide-angle end is equal to or more than 100° (horizontal angle of view is equal to or more than 90°), the F number is equal to or more than approximately 1.4, and the various aberrations can be well corrected, the zoom lens is suitable for the megapixel-compatible electronic imaging devices. Furthermore, since the zoom lens includes a lens having an aspheric surface, the various aberrations can be well corrected with fewer lenses, and a reduction in size, weight, and manufacturing cost can be achieved.

Thus, the zoom lens according to the embodiment described, is useful for megapixel-compatible electronic imaging devices, such as a digital still camera, a video camera, and a surveillance camera, and is especially suitable when high optical performance is needed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A zoom lens that includes a first lens group having negative refractive power and a second lens group having positive refractive power that are sequentially arranged from a subject side, and changes a focal length by changing a distance between the first lens group and the second lens group, wherein the second lens group includes, sequentially arranged from the subject side, a first lens that has positive refractive power and a convex surface facing toward the subject side, a second lens that has positive refractive power, an aspheric surface, and a convex surface facing toward the subject side, a third lens having negative refractive power, a fourth lens having positive refractive power, and a fifth lens including one lens or more having positive refractive power, the third lens and the fourth lens are connected, and the zoom lens satisfies following conditions, $Nd_{21}>1.8$ $vd_{24}>80$ where $Nd_{21}$ is a refractive index of the first lens of the second lens group at a d-line, and $vd_{24}$ is an Abbe number of the fourth lens of the second lens group at a d-line.

2. The zoom lens according to claim 1, wherein a surface of the fifth lens of the second lens group that is closest to the subject side is an aspheric surface.

3. The zoom lens according to claim 1, wherein at least one surface of the first lens of the second lens group is an aspheric surface.

4. The zoom lens according to claim 1, wherein a concave surface at a connection of the third lens and the fourth lens of the second lens group faces toward an image surface side.

5. The zoom lens according to claim 1, wherein the first lens group includes, sequentially arranged from the subject side, a first lens and a second lens, each of which is a meniscus lens having negative refractive power, a third lens that is a biconcave lens having negative refractive power, a fourth lens having positive refractive power, and a fifth lens that includes one lens or more having positive refractive power, the third lens and the fourth lens are connected, and the zoom lens satisfies following conditions, $Nd_{11}>1.7$ $Nd_{13}>1.7$ $Nd_{14}>1.7$ $vd_{13}>vd_{14}$ where $Nd_{11}$, $Nd_{13}$, and $Nd_{14}$ are respectively refractive indexes of the first lens, the third lens, and the fourth lens of the first lens group, and $vd_{13}$ and $vd_{14}$ are respectively Abbe numbers of the third lens and the fourth lens of the first lens group.

* * * * *